United States Patent [19]

Moss et al.

[11] Patent Number: 4,901,970
[45] Date of Patent: Feb. 20, 1990

[54] FISHING POLE HOLDER WITH UNIVERSALLY ADJUSTABLE MOUNT

[76] Inventors: Douglas M. Moss, 3301 Moritiz Dr., Huntington Harbor, Calif. 92649; Stanley W. Levashef, 8222 Drybank Dr., Huntington Beach, Calif. 92646

[21] Appl. No.: 302,930

[22] Filed: Jan. 30, 1989

[51] Int. Cl.$^4$ ............................................. F16M 13/00
[52] U.S. Cl. .................................... 248/514; 43/21.2; 224/282; 224/922; 248/534; 403/385
[58] Field of Search ............. 248/514, 516, 515, 534, 248/535, 541, 230; 403/385, 400; 43/21.2, 27.4; 224/922, 282

[56] References Cited

U.S. PATENT DOCUMENTS

| | | | |
|---|---|---|---|
| 3,886,560 | 5/1975 | Mortensen et al. | 248/515 X |
| 3,934,801 | 1/1976 | Johnson | 248/515 |
| 3,937,451 | 2/1976 | DiPaola et al. | 403/385 X |
| 4,093,171 | 6/1978 | Mengo, SR. | 248/515 |
| 4,495,721 | 1/1985 | Emory, Jr. | 43/274 X |
| 4,566,819 | 1/1986 | Johnston | 403/385 |
| 4,630,388 | 12/1986 | Furlong | 43/27.4 |
| 4,637,156 | 1/1987 | Simmons | 248/514 X |
| 4,807,384 | 2/1989 | Roberts, Sr. | 43/21.2 X |

Primary Examiner—Ramon O. Ramirez
Attorney, Agent, or Firm—Plante, Strauss, Vanderburgh

[57] ABSTRACT

There is disclosed a fishing pole holder having a tubular sleeve to receive the butt end of a fishing pole and a mounting bracket secured to the sleeve with an adjustable directional plate. The sleeve has a stud with at least one flatted surface which is received in a central, multiflatted aperture of a mounting clamp, thereby permitting the clamp to be indexed to any of a plurality of orientations on the mounting stud. The directional block is removably secured to the mounting block which is one member of a clamp formed of two blocks. Each of the blocks of the clamp has a central V-groove and these V-grooves are opposed to define a clamp passage therebetween.

9 Claims, 3 Drawing Sheets

FISHING POLE HOLDER WITH UNIVERSALLY ADJUSTABLE MOUNT

BACKGROUND OF THE INVENTION

1. Field of Invention

This invention relates to a holder for fishing poles and, in particular, a holder with a universally adjustable bracket.

2. Brief Statement of the Prior Art

Various attempts have been made to provide a fishing pole holder that is useful to hold fishing poles in upright positions on boats, in trolling positions during sport fishing. The poles must be supported with sufficient security that sudden jerks or pulls on the fishing line do not remove the pole from the holder. Holders with frictional locks are not suitable for this purpose. Consequently, the mounting brackets which have been used previously have been rigidly attached to their supports, often requiring drilling of the supports for permanent mounting of the holders. These holders have not provided adjustability in the angle of the supporting sleeve to its mounting bracket, thereby severely curtailing the possible installation locations for the holders.

OBJECTIVES OF THE INVENTION

It is an objective of this invention to provide a fishing pole holder that is very easy to install.

It is a further objective of this invention to provide a fishing pole holder which can be readily removed and installed in various locations.

It is also an objective of this invention to provide a fishing pole holder that is universally adjustable in the angular orientation of the sleeve which receives the fishing pole.

It is an additional objective of this invention to provide a fishing pole holder having a mounting bracket that will fit a variety of sizes of tubular rails commonly found on fishing vessels It is an added objective of this invention to provide a fishing pole holder that can be easily installed on rails of a fishing vessel.

BRIEF STATEMENT OF THE INVENTION

This invention comprises a fishing pole holder having a tubular sleeve to receive the butt end of a fishing pole and a mounting bracket secured to the sleeve with an adjustable directional plate. The sleeve has a stud with at least one flatted surface which is received in a central, multi-flatted aperture of a mounting clamp, thereby permitting the clamp to be indexed to any of a plurality of orientations on the mounting stud. The directional block is removably secured to the mounting block which is one member of a clamp formed of two blocks. Each of the blocks of the clamp has a central V-groove and these V-grooves are opposed to define a clamp passage therebetween.

BRIEF DESCRIPTION OF THE DRAWINGS

The invention will be described with reference to the FIGURES of which.

DESCRIPTION OF PREFERRED EMBODIMENTS

Figure 1:
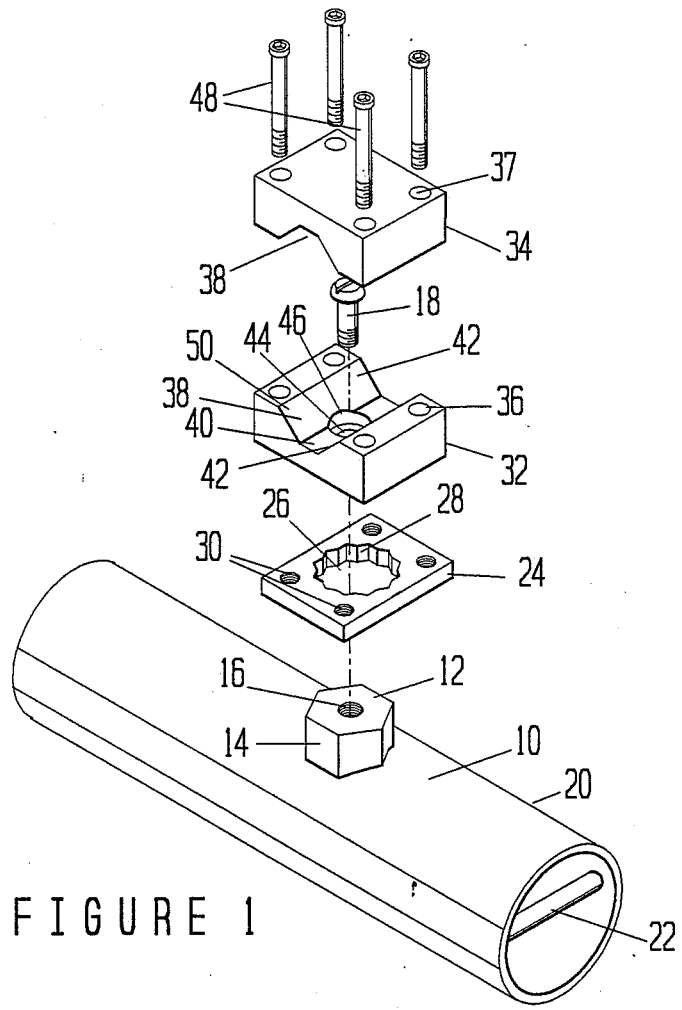
FIG. 1 is an exploded perspective views of the fishing pole holder, of the invention.

Referring now to FIG. 1, the fishing pole holder is illustrated as comprising a tubular member, sleeve 10 which has an upstanding boss 12 on its external surface intermediate its length. The boss 12 has indexing means which includes at least one flatted surface 14 and, preferably, is hexagonally flatted as shown and has a centrally located, internally threaded bore 16 which removably receives machine bolt 18. At end 20, the sleeve 10 has an abutment or stop for the end of a fishing pole. While this can have various shapes and configurations, the preferred stop member is a pin 22 that is transversely mounted and distally carried within the tubular sleeve.

The directional block 24 has a central through aperture 26 which has coacting indexing means, preferably a multiple number of flats 28, twelve flats being shown in the illustrated embodiment. The flats 28 have spacings and the aperture 26 has a sufficient diameter to permit the flats to be received over boss 12 and index with the flat 14 of the boss 12 on the sleeve 10. The directional block 24 also has four internally threaded bores 30, located, one each in each of its corners. Other indexing means can be used such as splines, multiple teeth, etc. The illustrated multiple flatted surfaces are preferred.

Two clamp blocks 32 and 34 are provided which have the same general configuration, each having the same width and length as the directional block 24 and each having corner through bores 36 and 37 which can be aligned with the internally threaded bores 30 of the directional block 24. Each of the clamp blocks 32 and 34 has a V-groove 38 traversing its width. These grooves 38 face each other, thereby defining a clamp passage 50 therebetween. The bottom of each of the V-grooves has a flat surface 40. Preferably, the side walls 42 of the V-grooves 38 are inclined at 45 degrees. The mounting clamp block 32 has a central through aperture 44 which has a counterbore 46 to receive the machine bolt 18 that extends through the block 32 and into threaded engagement with the central threaded bore 16 of the mounting stud 12. Four machine screws 48 are received, one each through each of the corner through bores 36 and 37 and be threadably engaged in the threaded bores 30 of the directional plate 24.

The pole holder is illustrated in FIG. 1 with the directional plate oriented in a position that will align the clamp passage 50 of the clamp blocks 32 and 34 with the axis of the sleeve 10. In the illustration, the clamp blocks 32 and 34 have been rotated 90 degrees from alignment with the directional plate 24.

Figure 2:
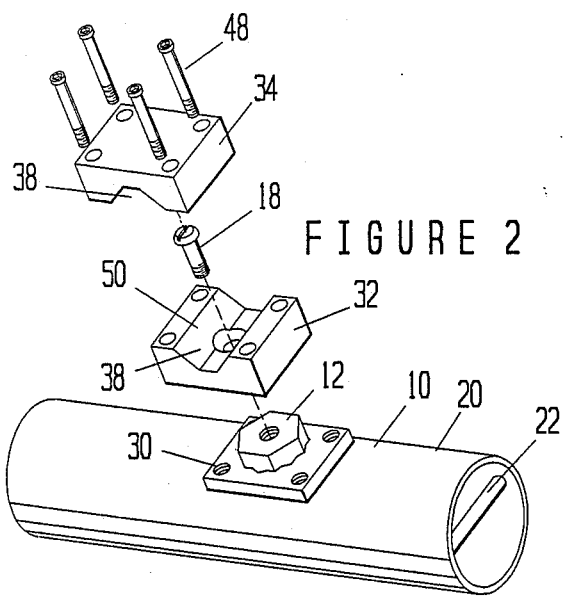
FIG. 2 is an exploded perspective view of the fishing pole holder with the directional plate in a changed orientation from its position in FIG. 1.
Figure 3:
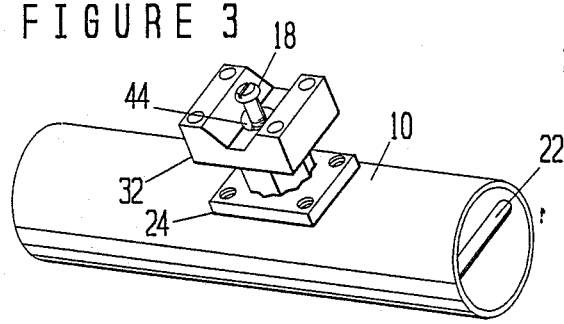
FIG. 3 illustrates the assembly of the mounting clamp to the tubular sleeve of the holder of the invention.
Figure 4:
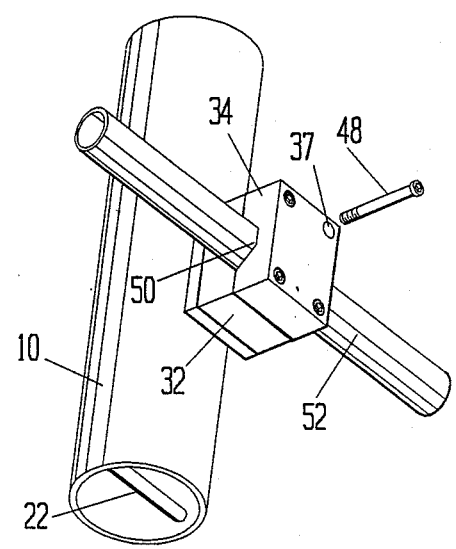
FIG. 4 illustrates the assembled holder.

Referring now to FIGS. 2-4, the invention is illustrated with the directional block 24 rotated 90 degrees to orient the clamp passage 50 at a right angle to the sleeve 10. For this purpose, the directional block 24 has been rotated ninety degrees from its position illustrated in FIG. 1.

FIG. 3 illustrates the first stage of the assembly in which the machine bolt 18 has been passed through the through aperture 44 of the mounting clamp block 32 and into the threaded bore 16 of the mounting stud 12.

In FIG. 4, the last step of the assembly is illustrated with the last of the machine screws 48 being inserted into one of the through bores 37 and into threaded engagement in a threaded bore 30 of the directional block 24. The blocks 32 and 34 have been clamped about a support rail 52, which can be a permanent part of the fishing vessel. As the machine screws 48 are inserted and tightened, the directional block 24 is lifted from the sleeve to compression against the underside of the mounting clamp block 32.

Figure 5:
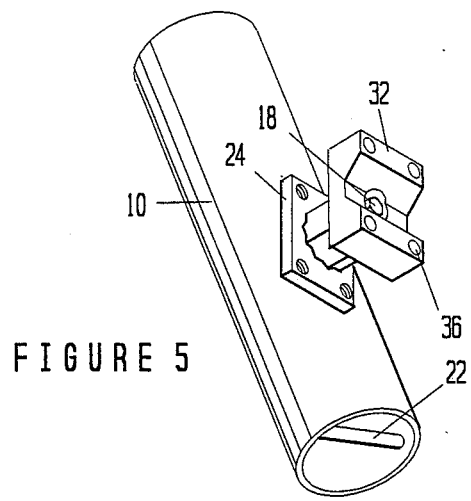
FIG. 5 illustrates the mounting bracket which has been rotated 30 degrees from the position shown in FIGS. 2-4.
Figure 6:
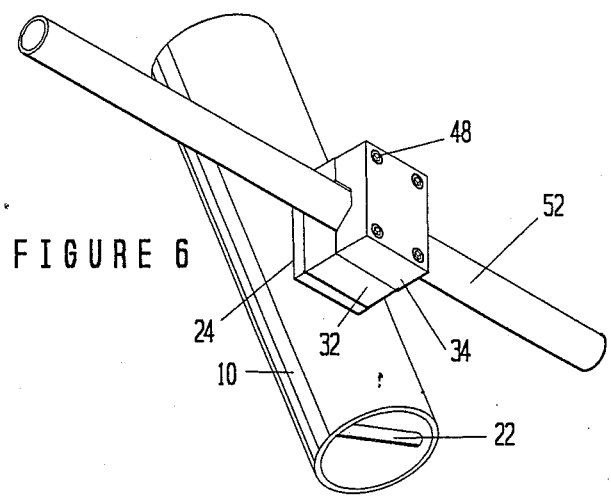
FIG. 6 illustrates the assembled fishing pole holder in the orientation shown in FIG. 5.

Referring now to FIGS. 5 and 6, the pole holder of the invention is shown rotated 30 degrees from its position shown in FIGS. 2 through 4. FIG. 5 illustrates the mounting clamp block 32 and directional plate 24 attached to the mounting stud in this angular orientation.

In FIG. 6 the complete fishing pole holder has been assembled and clamped to a supporting rail 52 that extends through the clamp passage 50.

The invention thus provides for a very easy installation of a fishing pole holder on any rail of rails having varied sizes, such as commonly found on fishing vessels. Because the clamp blocks have inclined side walls along the clamp passage, the clamps will adjust to any size of rail. The holder can be installed without any drilling or machining of the supporting structure as it simply clamps over the a rail of a fishing vessel. It can be readily adjusted to change the angle between the axis of the mounting sleeve and the supporting rail, thereby permitting mounting on vertical, horizontal or inclined rails of a boat. Because the holder can be readily disassembled, it can be moved to other locations on a fishing vessel or moved to other fishing vessels in a short period of time. Finally, the sleeve is positively locked to the clamp blocks without a frictional brake or engagement. Consequently, any sudden tugs on the fishing pole or line will not dislodge the preset angular orientation of the holder and fishing pole to the supporting structure.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A universal directional holder comprising:
   a. a boss having a rotational position indexing means comprising at least one flat on the outer surface of said boss and an internally threaded central bore;
   b. a directional indexing block having a central through aperture with coating rotational position indexing means comprising multiple flats on the interior wall of said through aperture received over said boss with said multiple flats indexed to a preselected rotational position on said boss;
   c. first and second planar clamp brackets received over said directional indexing block and having sufficient length and breadth to extend over substantially all of said indexing block member, each of said clamp brackets having a groove in one of its flat planar faces and coextensive one dimension thereof, said first and second planar clamp brackets mounted together with their respective grooves aligned and opposed to each other, defining a clamp passage therebetween;
   d. a single through aperture centrally positioned in the first of said clamp brackets and aligned with said internally threaded bore;
   e. a threaded fastener extending through said bore and threadably received in said internally threaded bore of said boss; and
   f. clamp fastener means securing said first and second clamp brackets together to compressively secure a supporting object within said clamp passage.

2. The directional holder of claim 1 wherein said supported member is a tubular sleeve.

3. The directional holder of claim 2 wherein said tubular sleeve has a distal abutment.

4. The directional holder of claim 3 wherein said distal abutment is a pin member traversing one end of said sleeve.

5. The directional holder of claim 1 wherein said boss is hexagonally flatted.

6. The directional holder of claim 5 wherein said through aperture has twelve symmetrically oriented flats and is received over said hexagonally flatted boss in any of 12 preselected orientations.

7. The directional holder of claim 1 wherein said fastener means comprises machine screws which are received through aligned apertures in said first and second clamp brackets and are threadably received in threaded bores of said indexing block member.

8. The directional holder of claim 1 wherein said supported member is a tubular sleeve to receive the end of a fishing pole.

9. The directional holder of claim 8 wherein said first and second clamp members form a clamp passage sufficiently large to clamp about tubular rail members having diameters from 0.75 to about 2.0 inches.

* * * * *